United States Patent
Zheng (10) Patent No.: US 8,963,007 B2
(45) Date of Patent: Feb. 24, 2015

(54) EARPHONE LINE, EARPHONE LINE TAKE-UP APPARATUS, EARPHONE ASSEMBLY AND MOBILE TERMINAL

(75) Inventor: Daqing Zheng, Urumqi (CN)

(73) Assignee: Xinjiang Tiandi Group, Urumqi, Xinjiang Province (CN)

( * ) Notice: Subject to any disclaimer, the term of this patent is extended or adjusted under 35 U.S.C. 154(b) by 1130 days.

(21) Appl. No.: 12/951,810

(22) Filed: Nov. 22, 2010

(65) Prior Publication Data

US 2011/0286621 A1 Nov. 24, 2011

(30) Foreign Application Priority Data

Nov. 23, 2009 (CN) .......................... 2009 1 0238042
Apr. 13, 2010 (CN) .......................... 2010 1 0147518

(51) Int. Cl.
*H04R 1/10* (2006.01)
*H01R 43/00* (2006.01)
(Continued)

(52) U.S. Cl.
CPC ............. *H04R 1/1033* (2013.01); *H02G 11/02* (2013.01); *H04M 1/15* (2013.01)
USPC .................. 174/110 R; 174/113 R; 174/71 R; 174/74 R (58) Field of Classification Search
CPC .......... H01B 7/1825; H01B 7/04; H01B 7/06; H01B 7/041; H01B 5/102; H01B 11/00; H04R 1/1016
USPC ......... 174/70 R, 71 R, 69, 72 R, 74 R, 102 R, 174/380, 370, 110 R, 113 R; 381/380, 370
See application file for complete search history.

(56) References Cited

U.S. PATENT DOCUMENTS 3,014,087 A 12/1961 Kaplan
6,858,951 B2 2/2005 Liao
(Continued)

FOREIGN PATENT DOCUMENTS

CN 101442693 A 5/2009
DE 20215444 U1 1/2003
(Continued)

OTHER PUBLICATIONS

Chinese Office Action and Search Report regarding Application No. 201010147518X, dated Jun. 24, 2013. Translation provided by Dragon Intellectual Property Law Firm.
(Continued)

*Primary Examiner* — Hoa C Nguyen
*Assistant Examiner* — Amol Patel
(74) *Attorney, Agent, or Firm* — Harness, Dickey & Pierce, P.L.C.

(57) ABSTRACT

The present invention provides an earphone line, an earphone line take-up apparatus, an earphone assembly and a mobile terminal. The earphone line comprises a bullet-proof fiber, insulated conductive wires and an earphone line skin, wherein: the earphone line further comprises conductors; the insulated conductive wires are wound around the bullet-proof fiber in a spiral fashion; the earphone line skin is attached to and wrapped on a surface of the insulated conductive wires to form a layer of super-thin, flexible and wear-resistant earphone line skin; and the conductors are at two ends of the earphone line and are to be connected to output and input ends of a signal connecting apparatus and of the earphone respectively during use. The present invention further provides a method for manufacturing the earphone line. Contrary to the traditional earphone line which is bulky and stiff and easy to be broken after hundreds of times of coiling, the new type earphone line of the present invention is very fine and flexible and possible to be coiled tens of thousands of times without being broken and can meet the life time requirement for the "built-in retractable earphone".

14 Claims, 10 Drawing Sheets

(51) Int. Cl.
*H02G 11/02* (2006.01)
*H04M 1/15* (2006.01)

(56) References Cited

U.S. PATENT DOCUMENTS

| | | | |
|---|---|---|---|
| 8,165,646 | B2 | 4/2012 | Zheng |
| 2005/0199414 | A1 | 9/2005 | Kim et al. |
| 2010/0307789 | A1* | 12/2010 | Sakai .......................... 174/112 |

FOREIGN PATENT DOCUMENTS

| | | |
|---|---|---|
| GB | 2354755 A | 4/2001 |
| JP | 2008010328 A | 1/2008 |
| WO | WO-02103713 A1 | 12/2002 |

OTHER PUBLICATIONS

Japanese Notification of Reasons for Refusal regarding Application No. 2010-255019, dated Nov. 30, 2012. Translation provided by Dragon Intellectual Property Law Firm.

Extended European Search Report regarding Application No. 10192285.4-1910 / 2436266, dated Feb. 11, 2013.

Mallory Nicholls. "Studio Installation Workshop. Basic Tools & Techniques." Sound on Sound. Sep. 2002.

European Office Action regarding Application No. 10 192 285.4-1910, dated Nov. 26, 2013.

Second Japanese Office Action regarding Application No. 2010-255019, dated Dec. 24, 2013. Translation provided by Dragon Intellectual Property Office.

* cited by examiner

EARPHONE LINE, EARPHONE LINE TAKE-UP APPARATUS, EARPHONE ASSEMBLY AND MOBILE TERMINAL

RELATED APPLICATIONS

The present application claims priorities from Chinese Application No. 200910238042.8 filed on Nov. 23, 2009 and Chinese Application No. 201010147518.X filed on Apr. 13, 2010, the disclosures of which are hereby incorporated by reference herein in their entirety.

BACKGROUND OF THE INVENTION

1. Field of the Invention

The present invention relates to a new earphone line named "built-in retractable earphone" and more particularly to an earphone line, an earphone line take-up apparatus, an earphone assembly and a mobile terminal.

2. Description of the Prior Art

Currently, among the known technologies and practical products, there is no earphone line which can be retractably coiled into a small device (earphone line take-up apparatus), nor an earphone line which can be coiled tens of thousands of times without being broken. However, with the coming of the 3G times and the increasing applications of earphone (such as video communication, TV on mobile phone and music), a new "built-in retractable earphone" will become one of the requisites in people's life and necessary to all audio electronic products such as mobile phone, computer and personal stereo. This new type "built-in retractable earphone" is built in all electronic products with audio-visual stereo, such as mobile phone, computer and personal stereo, which allowing the earphone and the earphone line to be pulled out together when the use thereof is needed and to be put back into the product automatically after the usage. However, for the reason that the earphone line equipped outside is stiff, easy to be tangled and broken and inconvenient resulted from the forgoing defects, the "built-in retractable earphone" concept has not been realized. In order to make the "built-in retractable earphone" realized and brought the same into popular application, the crucial point is to solve the problem of the earphone line for being stiff and easy to rupture. Without a new earphone line which is very fine and flexible and can be coiled tens of thousands of times without being broken, the idea of the "built-in retractable earphone" cannot be realized and the "built-in retractable earphone" cannot be built in any electronic products with audio-visual stereo such as mobile phone, computer and personal stereo, which cannot make the earphone and the earphone line be pulled out together when people need to use it and cannot make the same be put back into the product automatically at the end of the usage.

According to the prior art, the construction process of the earphone line is firstly to construct a group of conductors by winding several insulated conductive wires on the bullet-proof fibre, and then, according to practice, to wind several groups of conductors on another bullet-proof fibre, and finally to form the earphone line by wrapping a skin thereon. The earphone lines manufactured according to such construction process cannot endure coiling for tens of thousands of times due to their common defect: they are constructed by winding several groups of conductors together on the bullet-proof fibre, and to give that the radius of the earphone is relatively small, repeating coiling will cause inter-friction, spacing and loose among these several conductors, and after the repeating coiling for thousands of times, the insulating layer on the insulated conductive wire will be abraded and short cut will occur because of creepage; the skin of the earphone line is easy to be ruptured because of inflation when there is spacing between several groups of conductors; at the same time, during the coiling of the earphone line, when there is spacing and friction between each other, the fine insulated conductive wire is easier to be ruptured. Therefore, the earphone line manufactured according to the prior art will be damaged or ruptured after being coiled for thousands of times and cannot meet the life time requirement of a "built-in retractable earphone" line which should endure the coiling for tens of thousands of times without being damaged and ruptured.

SUMMARY OF THE INVENTION

An objective of the present invention is to provide a new earphone line to solve the above drawbacks of the traditional earphone lines. The new earphone line can be applied to a "built-in retractable earphone", and can realize the innovation conception of the "built-in retractable earphone" and make the "built-in retractable earphone" popular.

The technical solutions of the present invention are as follows.

An earphone line, comprising a bullet-proof fibre, insulated conductive wires and an earphone line skin, wherein:
  the earphone line further comprises conductors;
  the insulated conductive wires are wound around the bullet-proof fibre in a spiral fashion;
  the earphone line skin is attached to and wrapped on a surface of the insulated conductive wires to form a layer of super-thin, flexible and wear-resistant earphone line skin; and
  the conductors are at two ends of the earphone line and, when in use, are to be connected to the output and input ends of a signal connecting apparatus and those of an earphone respectively.

Preferably, the conductors are formed by grouping several insulated conductive wires together.

Preferably, the number of the insulated conductive wires is plural.

Preferably, the number of the insulated conductive wires is 12 to 36.

Preferably, the conductors are of several groups and each group of conductors comprises multiple insulated conductive wires.

Preferably, the conductors are of 3 to 8 groups and each group of conductors comprises 2 to 8 insulated conductive wires.

Preferably, the insulated conductive wires are fine and flexible.

A method for manufacturing the earphone line, comprising:
  winding the insulated conductive wires closely around a bullet-proof fibre in a spiral fashion and in a manner of being close to and in parallel with each other;
  attaching the earphone line skin to and wrapping the same on a surface of the insulated conductive wires to form a layer of super-thin, flexible and wear-resistant earphone line skin; and
  splitting the insulated conductive wires at two ends of the earphone line and forming conductors by grouping several corresponding insulated conductive wires together, wherein the conductors at two ends of the earphone line are to be connected respectively to the output and input ends of a signal connecting apparatus and those of an earphone.

Preferably, plural insulated conductive wires are wound around the bullet-proof fibre.

Preferably, 12 to 36 insulated conductive wires are wound around the bullet-proof fibre.

Preferably, several groups of conductors are formed and each group of conductors comprises multiple insulated conductive wires.

Preferably, the conductors are of 3 to 8 groups and each group of conductors comprises 2 to 8 insulated conductive wires.

Preferably, a fibre with strong stretching resistance is made from multiple kinds of materials, and a bullet-proof fibre is made from multiple such fibres.

Preferably, the earphone line skin is compositely made from materials which are insulated, wear-resistant and having strong adhesive force, and the insulated conductive wires which are wound around the bullet-proof fibre are wrapped closely inside the earphone line skin by a special process.

An earphone line take-up apparatus, comprising:
  a driving system;
  a driving wheel, provided on one side of the driving system and driven by the driving system;
  a supporting wheel, provided on an opposite side of the driving system; and
  a winding line coil, surrounding the driving wheel and the supporting wheel and used for winding an earphone line, wherein the earphone line wound on the winding line coil is connected with an external signal through a signal connecting apparatus and the driving wheel drives the supporting wheel to rotate through the winding line coil to make the earphone line wound on the winding line coil for take-up.

Preferably, the earphone line take-up apparatus further comprises: a clutch device, provided between the driving system and the driving wheel, wherein the driving system drives the driving wheel through the clutch device and the clutch device separates the driving system from the driving wheel when the earphone line is loosed to drive the rotation of the driving wheel or when a take-up operation is finished.

Preferably, the driving system is a mini-motor and the clutch device is a circular-truncated-cone shaped gear.

Preferably, the driving wheel includes a first round side sheet and a second round side sheet, the first round side sheet and the second round side sheet are connected with each other through a main shaft and an inner side of the first round side sheet is provided with multiple teeth arranged in a circumference surrounding the main shaft; and
  the mini-motor engages with or separates from the circular-truncated-cone shaped gear through teeth provided on the main shaft of the mini-motor.

Preferably, a ring-shaped winding line slot formed by multiple U-shaped slots for holding the earphone line is provided on the winding line coil and the earphone line can be wound in the ring-shaped winding line slot when a take-up operation is performed.

Preferably, the earphone line take-up apparatus further comprises: a shell of an oblong oval shape, wherein an opening is provided on a side wall of the shell and the earphone line protrudes out from the shell through the opening.

Preferably, the signal connecting apparatus comprises:
  multiple signal linking elastic sheets, provided outside the U-shaped slots, wherein the earphone line is connected with the signal linking elastic sheets; and
  multiple signal linking rails, provided on an inside wall of the shell and possible to be in contact link with the multiple signal linking elastic sheets, wherein the signal linking rails are constituted by ring-shaped conductive metal sheets and are connected with a mainboard signal of an outside terminal through a signal line.

Preferably, the supporting wheel consists of multiple rolling balls or rollers arranged in a semi-circumference.

An earphone assembly, comprising an earphone, an earphone line and an earphone line take-up apparatus, wherein the earphone line take-up apparatus comprises:
  a driving system;
  a driving wheel, provided on one side of the driving system and driven by the driving system;
  a supporting wheel, provided on another side of the driving system; and
  a winding line coil, surrounding the driving wheel and the supporting wheel and used for winding an earphone line, wherein the earphone line wound on the winding line coil is connected with an external signal through a signal connecting apparatus, and the driving wheel drives the supporting wheel to rotate through the winding line coil to make the earphone line wound on the winding line coil for take-up.

Preferably, the earphone assembly further comprises: a clutch device, provided between the driving system and the driving wheel, wherein the driving system drives the driving wheel by the clutch device and the clutch device separates the driving system from the driving wheel when the earphone line is loosed to make the driving wheel rotate or when a take-up operation is finished.

Preferably, the driving system is a mini-motor and the clutch device is a circular-truncated-cone shaped gear;
  the driving wheel includes a first round side sheet and a second round side sheet, the first round side sheet and the second round side sheet are fixed through a main shaft and an inner side of the first round side sheet is provided with multiple teeth arranged in a circumference surrounding the main shaft; and
  the mini-motor engages with or separates from the circular-truncated-cone shaped gear through teeth provided on the main shaft of the mini-motor.

Preferably, a ring-shaped winding line slot formed by multiple U-shaped slots for holding the earphone line is provided on the winding line coil and the earphone line can be wound in the ring-shaped winding line slot when a take-up operation is finished.

Preferably, the earphone line take-up apparatus further comprises: a shell of an oblong oval shape, wherein an opening is provided on a side wall of the shell and the earphone line protrudes out from the shell through the opening.

Preferably, the signal connecting apparatus comprises:
  multiple signal linking elastic sheets, provided outside the U-shaped slots, wherein the earphone line is connected with the signal linking elastic sheets; and
  multiple signal linking rails, provided on an inside wall of the shell and possible to be in contact link with the multiple signal linking elastic sheets, wherein the signal linking rails are constituted by ring-shaped conductive metal sheets and are connected with a mainboard signal of an outside terminal through a signal line.

Preferably, a take-up switch is provided on the earphone and the take-up switch controls ON and OFF of the driving system by a signal line provided in the earphone line.

A mobile terminal, comprising a terminal body, wherein the mobile terminal further comprises the earphone assembly.

Contrary to the traditional earphone lines which are bulky and stiff and easy to be broken after hundreds of times of coiling, the new type earphone line of the present invention is very fine and flexible and possible to be coiled tens of thousands of times without being broken and can meet the life time requirement for the "built-in retractable earphone line". Further, provided with the construction of the driving system, driving wheel and supporting wheel in the earphone line take-up apparatus according to the present invention, the coiling length of the earphone line is increased a lot and the size of the earphone line take-up apparatus is reduced. The earphone line take-up apparatus with dwindled size may be better equipped to different kinds of mobile terminals.

BRIEF DESCRIPTION OF THE DRAWINGS

In order to describe the embodiments of the present invention or the technical solutions of the prior art more clearly, a brief introduction of the accompanying drawings used in the description thereof is given below. Apparently, the following description of drawings covers merely a few embodiments of the present invention, and, for a person skilled in the art, other drawings may be obtained based on these given ones without making inventive efforts.

DETAILED DESCRIPTION OF THE PREFERRED EMBODIMENTS

The technical solutions of the embodiments for the present invention will be described clearly and completely as below, with reference to the drawings. Apparently, the following description covers only a few, but not all, of the embodiments of the present invention. All other embodiments obtained by a person skilled in the art based on the ones provided herein without any inventive efforts are within the scope protected by the present invention.

Figure 9:
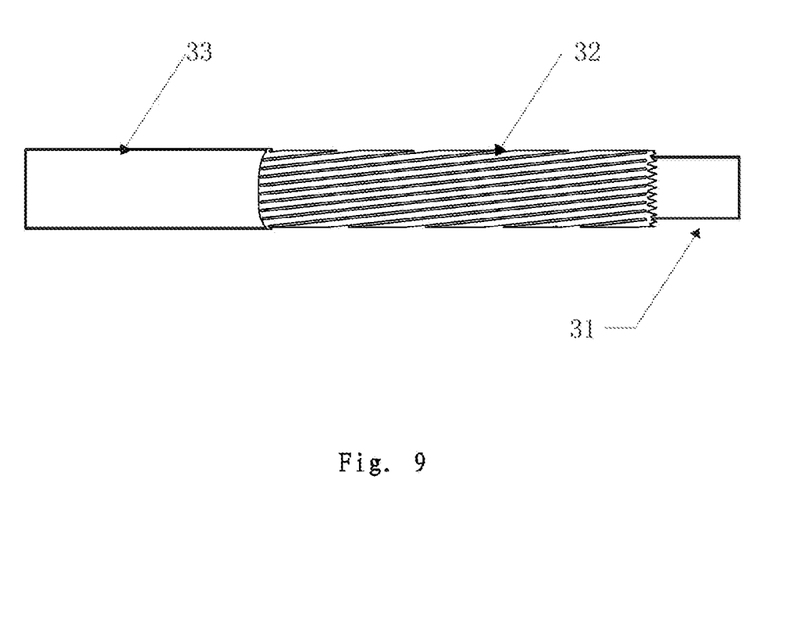
FIG. 9 is a perspective cross sectional view of the structure of the earphone line according to the present invention.
Figure 10:
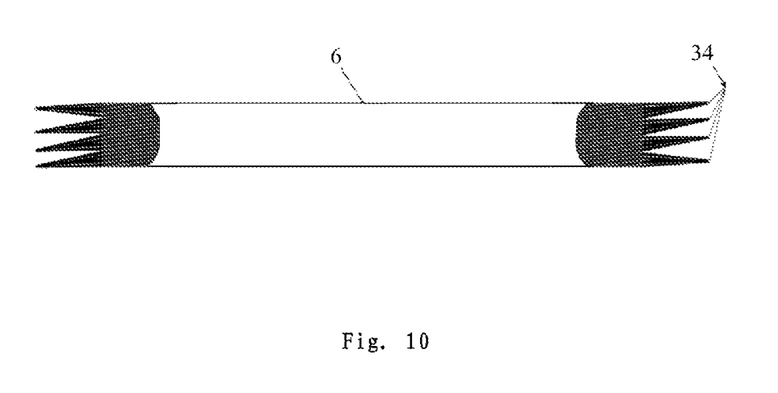
FIG. 10 is a perspective cross sectional view of the structure of an end of the earphone line according to the present invention.

As shown in FIG. 9 and FIG. 10, a new earphone line 6 of the present invention comprises a bullet-proof fibre 31, insulated conductive wires 32, conductors 34 and an earphone line skin 33. The insulated conductive wires 32 are wound around the bullet-proof fibre 31 in a spiral fashion, wherein "spiral fashion" means that the insulated conductive wires 32 are at a certain angle with the longitude direction of the bullet-proof fibre 31 so that the insulated conductive wires 32 are not in parallel with the longitude direction of the bullet-proof fibre 31 and only the insulated conductive wires 32 are parallel with each other, as showing in FIG. 9. The earphone line skin 33 attaches to and wraps on the surfaces of the insulated conductive wires 32 which have been wound on the bullet-proof fibre 31, to form a super-thin, flexible and wear-resistant skin. The conductors 34 are located at the two ends of the earphone line 6, which has been truncated according to the required length, and are formed by separating insulated conductive wires 32 into several groups wherein each group include several insulated conductive wires 32, as shown in FIG. 10. The number of the insulated conductive wires 32 in the earphone line 6 is plural, preferably 12 to 36. The conductors 34 in the earphone line 6 are of several groups, preferably 3 to 8 groups. Each group of conductors 34 may include multiple insulated conductive wires 32, and preferably 2-8 insulated conductive wires 32, as one group, form one group of conductors 34. When in use, the conductors 34 at the two ends of the earphone line 6 are connected respectively to the ends of an earphone and the signal connecting apparatus of the present invention. The insulated conductive wires herein mean conductive wires with insulated outer layers.

In order to make the earphone line 6 fine, flexible and possible to be coiled tens of thousands of times without being broken, a completely new technical process is obtained after tens of thousands of times of time-consuming experiments of construction process combination. The earphone line 6 manufactured according to this new technical process is not only fine and flexible but also possible to be coiled tens of thousands of times without being broken.

Firstly, a plurality of (usually 12 to 36) insulated conductive wires 32 are wound closely around the bullet-proof fibre 31 in a spiral fashion and in a manner of being close to and in parallel with each other, as shown in FIG. 9. Secondly, the earphone line skin 33 is attached to and wrapped on the surface of the insulated conductive wires 32 by a special process, to form a layer of super-thin, flexible and wear-resistant earphone line skin 33, so that a semi-manufactured earphone line is formed. Next, the semi-manufactured earphone line is cut into several earphone lines according to the required length, and the conductive wires 32 are separated from each other, and then several corresponding insulated conductive wires 32 are combined into one group (generally 2-8 insulated conductive wires 32 are in one group) to form the conductors 34 (generally the conductors 34 in the earphone line 6 are in 3 to 8 groups). Several groups of conductors 34 may be formed according to the requirement, as shown in FIG. 10, and thereby to form the new type earphone line 6 of the present invention.

In addition, insulated conductive wires 32 are insulated conductive wires which are fine and flexible.

In addition, a fibre with strong anti-tension ability is made from a composition of different materials, and the bullet-proof fibre 31 is formed by a plurality of such fibres.

In addition, the earphone line skin 33 is made by compositing different materials which are insulated, wear-resistant and strongly adhesive, and the insulated conductive wires 32 which are wound closely around the bullet-proof fibre 31 are wrapped inside the earphone line skin 33 by a special process.

According to the earphone line 6 manufactured by this construction process, since each one of insulated conductive wires 32 is wound closely around the bullet-proof fibre 31 in a spiral fashion and in a manner of being close to and in parallel with each other (different from the prior art in which the insulated conductive wires 32 are wound a group after a group and there will be large spacing between groups), there is no spacing between the insulated conductive wires 32 and there will be no friction, shortcut or rupture therebetween, no matter how they are coiled during practical use, and thus the lifetime of the earphone line 6 which needs to be coiled often is prolonged by hundreds of times. This is a change and innovation, which makes the earphone line 6 of the present invention substantially different from that of the prior art when being coiled. This is what called "innovation decides success".

Obvious differences between the present invention and the prior art rest also with that: in the new type earphone line of the present invention, the insulated conductive wires are divided into several groups only at the two ends of the line, and such construction reduces the folding angle of the insulated conductive wires when coiled, and reduces also the "ravines" between the insulated conductive wires so as to reduce the filling by the earphone line skin between the "ravines", and thereby reduces the thickness of the earphone line skin while increasing the flexibility thereof.

Figure 1:
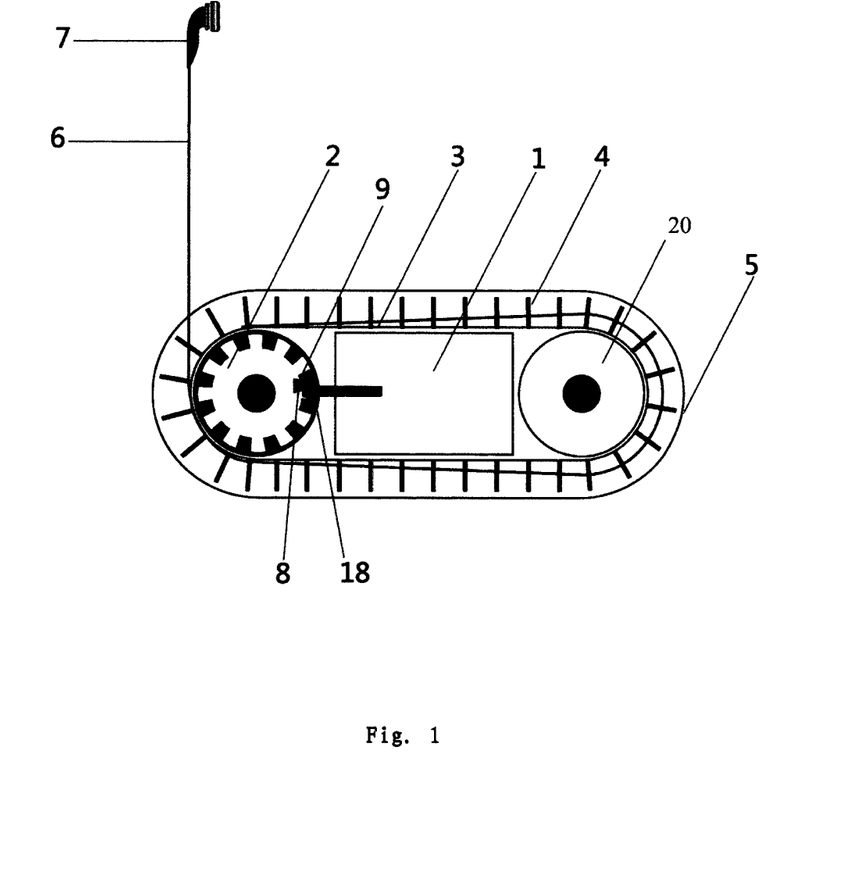
FIG. 1 is a cross sectional view showing a structure of an earphone line take-up apparatus according to the present invention.

Referring to FIG. 1 which is a cross sectional view showing a structure of the earphone line take-up apparatus according to the present invention. The earphone line take-up apparatus includes a driving system 1, a driving wheel 2, a supporting wheel 20 and a winding line coil 3.

The driving system 1 may be a mini-motor, a spring or any other driving apparatus which can provide driving force. In the embodiment of the present invention, the driving system 1 is preferably a mini-motor.

The driving wheel 2 is provided on one side of the driving system 1 and is driven by the driving system 1.

The supporting wheel 20 is provided on the opposite side of the driving system 1.

The winding line coil 3 surrounds the driving wheel 2 and the supporting wheel 20. The winding line coil 3 is used to wind the earphone line 6. The earphone line 6 wound on the winding line coil 3 is connected with an external signal through a signal connecting apparatus. The driving wheel 2 drives, through the winding line coil 3, the supporting wheel 20 to rotate to make the earphone 6 wound on the winding line coil 3 for take-up of the line. Said earphone line 6 may be the ones shown in FIG. 9 and FIG. 10.

The earphone line take-up apparatus further includes a clutch device 8 provided between the driving system 1 and the driving wheel 2. The driving system 1 drives the driving wheel 2 by the clutch 8 and the clutch 8 separates the driving system 1 and the driving wheel 2 when the earphone line 6 is loosed to drive the rotation of the wheel 2.

By the provisions of the clutch 8, when the take-up of the earphone line 6 is performed, the driving system 1, i.e. a mini-motor, starts to work. The driving system 1 drives the driving wheel 2 through the clutch 8. The driving wheel 2 drives the rotation of the supporting wheel 20 through the winding line coil 3, so that the earphone line 6, one end of which is fixed to the winding line coil 3, can be wound on the winding line coil 3. When the earphone line 6 is loosed (the user pulls the earphone line 6 out), the earphone line 6 will drive the driving wheel 2, the winding line coil 3 and the supporting wheel 20 to rotate. At this time, the clutch 8 separates the driving system 1 from the driving wheel 2 to reduce the resistance during the line pulling, so that no influence will be exerted on the driving system 1, i.e. a mini-motor. At the same time, when the take-up of the earphone line 6 is finished or the resistance in the take-up exceeds a preset limit, the clutch 8 will make the driving wheel 2 and the driving system 1 slip with each other, or separate the driving system 1 from the driving wheel 2 to make the driving system 1, i.e. a mini-motor, run idle for the purpose of protecting the mini-motor from being damaged.

Figure 2:
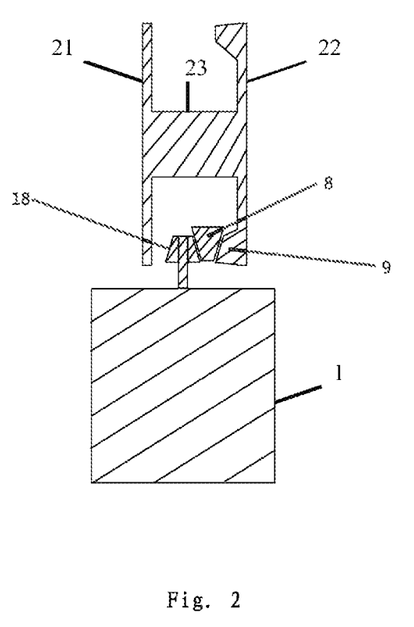
FIG. 2 is a schematic view showing relations between a driving system, a clutch apparatus and a driving wheel.

Referring to FIG. 2, the clutch 8 is preferably a circular-truncated-cone shaped gear. Of course, a person skilled in the art may understand that the clutch 8 may be a bevel gear, a cylindrical shaped gear or other kind of clutches. The present invention does not limit the type of the clutch 8.

Figure 8:
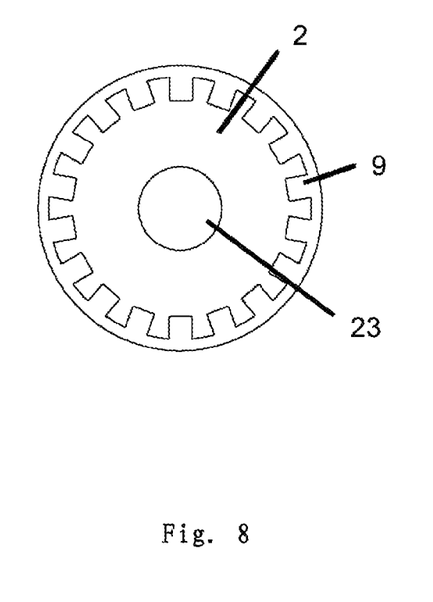
FIG. 8 is a cross sectional view of the driving wheel according to the present invention.

The driving wheel 2 includes a first round side sheet 22 and a second round side sheet 21. The first round side sheet 22 and the second round side sheet 21 are fixed through a main shaft 23. As shown in FIG. 8, the inner side of the first round side sheet 22 is provided with multiple teeth 9 arranged circumferentially surrounding the shaft 23. The mini-motor engages with the circular-truncated-cone shaped gear (clutch 8) through teeth 18 provided on the main shaft of the mini-motor. The circular-truncated-cone shaped gear engages with teeth 9 provided on the driving wheel 2 so that the driving system 1 drives the driving wheel 2 through the circular-truncated-cone shaped gear.

When the clutch 8 is a gear, the teeth provided on the main shaft of the mini-motor and the teeth 9 provided on the driving wheel 2 match with the gear as the clutch 8. If the clutch 8 is a circular-truncated-cone shaped gear, the teeth provided on the main shaft of the mini-motor are also of a circular-truncated-cone shape and they are matched to engage with each other. If the clutch 8 is a bevel gear, the teeth provided on the main shaft of the mini-motor can be conical teeth. Thus, when the mini-motor is working, the teeth on the main shaft of the mini-motor engage closely with the gear as the clutch 8 and the gear as the clutch 8 will in turn engages closely with teeth 9 on the driving wheel 2 so as to drive the driving wheel 2 to rotate. When the earphone line 6 is loosed to drive the rotation of the wheel 2, the gear as the clutch 8 engages with neither the driving wheel 2 nor the gear on the mini-motor, so that the earphone line 6 may be pulled out easily. Besides, the rotation of the driving wheel 2 does not drive the mini-motor to rotate, so that no adverse influence will be produced on the mini-motor.

The earphone line take-up apparatus further includes a shell 5 of an oblong oval shape. An opening is provided on a side wall of the shell 5 and the earphone line 6 protrudes out from the shell 5 through the opening.

According to the provision of the driving system 1, driving wheel 2 and supporting wheel 20 of the present invention, the earphone line take-up apparatus forms an appearance of an oblong oval shape so as to save volume as much as possible and to wind linger earphone line 6.

Figure 3:
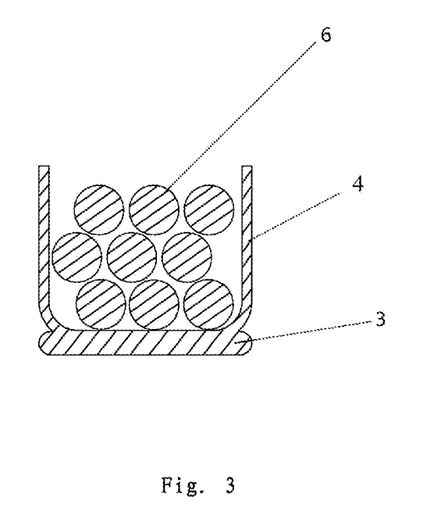
FIG. 3 is a cross sectional view of a winding line coil and a U-shaped slot for holding the earphone line, provided on the winding line coil, according to the present invention.

Referring to FIG. 3, in the embodiment of the present invention, the winding line coil 3 may be of a strap loop or a pedrail structure, and may be manufactured from materials such as plastic, metal, metalloid and so on. In order to better fix the wound earphone line 6, multiple U-shaped slots 4 for holding the earphone line may be provided in an interval of a predetermined distance (preferably 2-8 mm in the embodiment of the present invention) on the winding line coil 3. The multiple U-shaped slots 4 are arranged to form a ring-shaped winding line slot and the earphone line 6 can be wound in such ring-shaped winding line slot when a take-up operation is performed.

Figure 4:
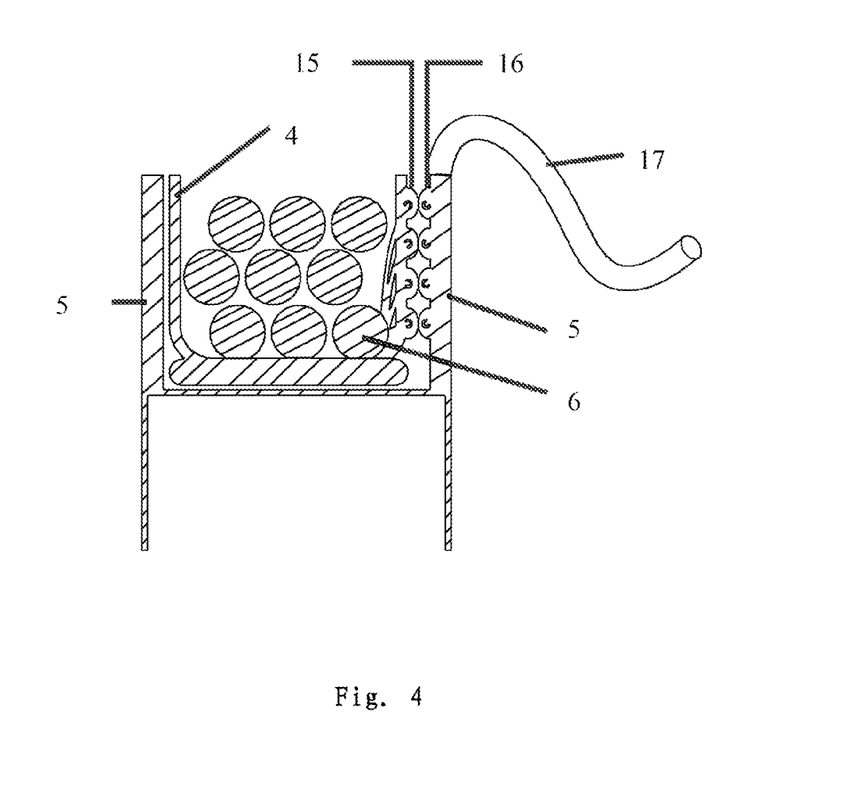
FIG. 4 is a schematic view showing relations among the U-shaped alignment slot, a signal connection apparatus and a shell.

Referring to FIG. 4, the signal connecting apparatus includes:

multiple signal linking elastic sheets 15 provided outside the U-shaped slots 4, the earphone line 6 being connected with the signal linking elastic sheets 15 through the earphone signal line;

multiple signal linking rails 16 provided on an inside wall of the shell 5 and possible to be in contact link with the multiple signal linking elastic sheets 15, such signal linking rails 16 being constituted by ring-shaped conductive metal sheets and connected with a mainboard signal of an outside terminal through the signal line.

The line end of the earphone line 6 is fixed in a U-shaped slot 4 and multiple earphone signal lines are branched therefrom to connect with the signal link elastic sheets 15.

It should be noted that the signal link elastic sheets 15 are provided on a U-shaped slot 4 at the earphone line end and the signal linking rails 16 need to be looped along the inside wall of the shell 5. Therefore, when the signal elastic sheets rotate with the U-shaped slots 4, they will be in frictional sliding contact with the signal linking rails 16 to guarantee communication.

Figure 5:
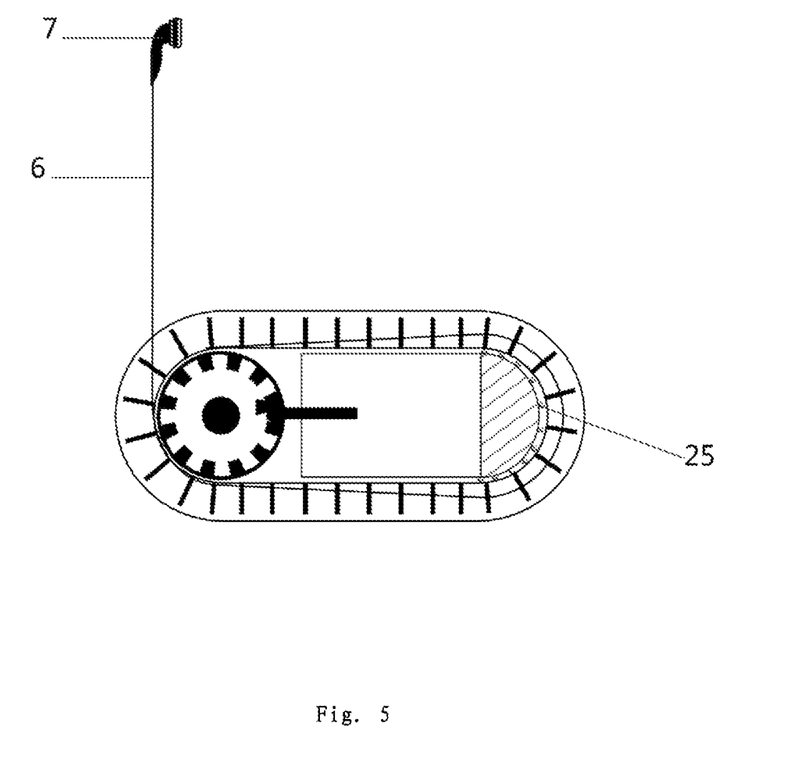
FIG. 5 is a cross sectional view showing the structure of an earphone line take-up apparatus according to another embodiment of the present invention.

In one embodiment of the present invention, the supporting wheel 20 is a round object. In another embodiment of the present invention, referring to FIG. 5, the supporting wheel 20 is multiple rolling balls 25 or rollers 25 arranged in a semicircumference or other objects which can roll and slide. Compared with a round object, the supporting wheel 20 as rolling balls or rollers may further reduce the size of the earphone line take-up apparatus.

Provided with the construction of the driving system 1, driving wheel 2 and supporting wheel 20 in the earphone line take-up apparatus according to the present invention, the length of the earphone line 6 which can be wound is increased greatly and the size of the earphone line take-up apparatus is reduced. The earphone line take-up apparatus with a dwindled size may be better equipped to different kinds of mobile terminals. In addition, according to the present invention, the main shaft gear of the driving system 1, the inner side gear of the driving wheel 2 and the winding line coil 3 interact with each other to form a decelerator automatically so as to increase the torque of the driving system 1, i.e. a mini-motor, and to increase the length of the earphone line 6 which can be wound a lot.

Figure 6:
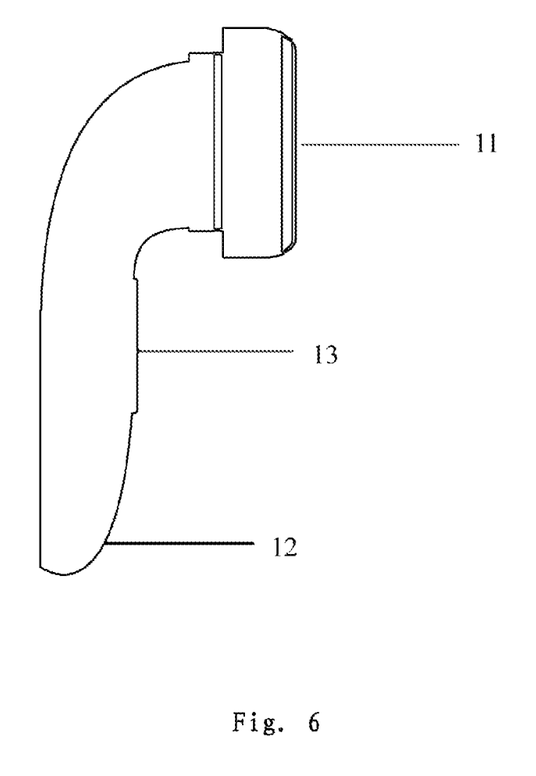
FIG. 6 is a schematic view showing the structure of an earphone according to the present invention.

Referring to FIG. 1 and FIG. 6, the present invention further discloses an earphone assembly, comprising: an earphone 7 constituted integrally by a telephone transmitter 12 and a telephone receiver 13, earphone line 6 and an earphone line take-up apparatus. The earphone line take-up apparatus has been described in detail in the above embodiments and will not be illustrated here. Although the earphone in the present invention is constituted by the telephone transmitter 12 and the telephone receiver 13, the earphone 7 may also be constituted by the telephone transmitter 12 only or by the telephone receiver 13 only.

In addition, for the convenience of operation, the earphone 7 is provided with a take-up switch 13 which controls the ON and OFF of the power supply of the driving system 1, i.e. a mini-motor, by the signal line arranged in the earphone line 6, so that the take-up operation for the earphone line 6 can be controlled flexibly.

Figure 7:
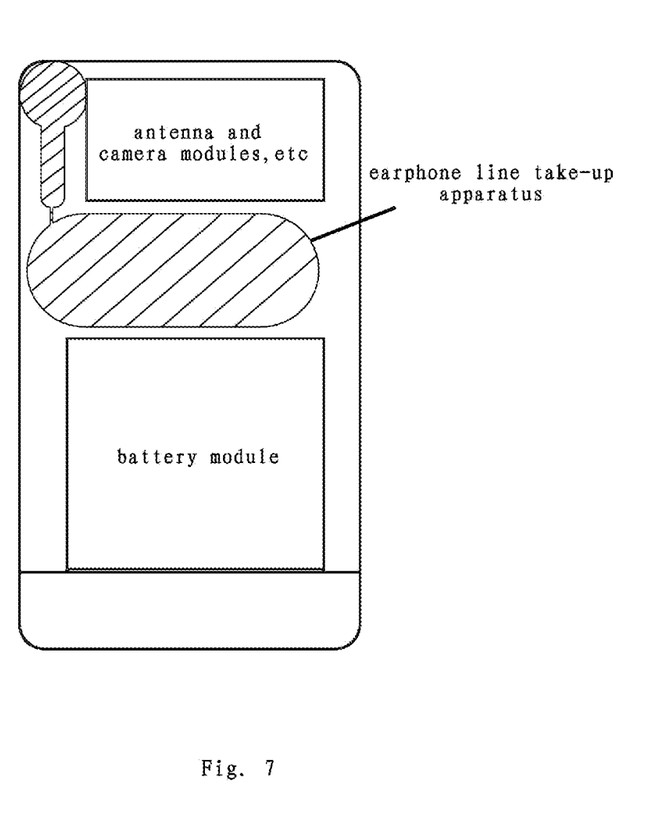
FIG. 7 is a schematic view showing the structure of a mobile terminal according to the present invention.

The present invention further provides a mobile terminal. Referring to FIG. 7, the mobile terminal includes a terminal body and the earphone assembly of the present invention. The earphone assembly of the present invention includes: an earphone 7 formed integrally by a telephone transmitter 12 and a telephone receiver 13, an earphone line 6 and an earphone line take-up apparatus. The earphone line take-up apparatus has been described in detail in the above embodiments and will not be illustrated here. Although the earphone in the present invention is constituted by the telephone transmitter 12 and the telephone receiver 13, the earphone 7 also may be constituted by the telephone transmitter 12 only or by the telephone receiver 13 only.

In order to arrange different components of the mobile terminal reasonably, taking a handset as an example as shown in FIG. 7, the earphone line take-up apparatus may be arranged between systems, such as the antenna and the camera, and the handset battery module. Certainly, the position of the earphone line take-up apparatus in the mobile terminal is not limited in any way in the present invention, and the earphone line take-up apparatus of the present invention may be arranged at any positions in the mobile terminal.

According to the present invention, the mobile terminal may be any electric device to which the earphone may be applied, such as MP3, MP4, MP5, computer, play station control, handset and so on.

The above are only preferred embodiments of the present invention and do not intend to limit the present invention. Any amendments, equivalent replacements and improvements within the spirits and principles of the present invention should fall in the claimed scope of the present invention.

What is claimed is:

1. An earphone line, comprising a bullet-proof fibre, insulated conductive wires and an earphone line skin, wherein:
the earphone line further comprises conductors;
the insulated conductive wires are wound closely around the bullet-proof fibre in a helix shape in a manner of being closely parallel with each other to form a layer of insulated conductive wires, and there is no spacing between the insulated conductive wires;
the earphone line skin is attached to and wrapped on a surface of the insulated conductive wires to form a layer of super-thin, flexible and wear-resistant earphone line skin; and
the conductors are at two ends of the earphone line and are to be connected to output and input ends of a signal connecting apparatus and of an earphone respectively during use, each group of conductors include multiple insulated conductive wires,
wherein the helix shape means that the insulated conductive wires are at a certain angle with a longitude direction of the bullet-proof fibre so that the insulated conductive wires are not parallel with the longitude direction of the bullet-proof fibre and only the insulated conductive wires are parallel with each other.

2. The earphone line according to claim 1, wherein the conductors are formed by grouping several insulated conductive wires together.

3. The earphone line according to claim 1, wherein the number of the insulated conductive wires is plural.

4. The earphone line according to claim 3, wherein the number of the insulated conductive wires is 12 to 36.

5. The earphone line according to claim 1, wherein the conductors are of several groups, and each group of conductors comprises multiple insulated conductive wires.

6. The earphone line according to claim 5, wherein the conductors are of 3 to 8 groups and each group of conductors comprises 2 to 8 insulated conductive wires.

7. The earphone line according to claim 1, wherein the insulated conductive wires are fine and flexible.

8. A method for manufacturing the earphone line according to claim 1, wherein the method comprises:
winding insulated conductive wires closely around a bullet-proof fibre in a spiral fashion and in a manner of being close to and in parallel with each other;
attaching the earphone line skin to and wrapping the same on a surface of the insulated conductive wires to form a layer of super-thin, flexible and wear-resistant earphone line skin; and,
splitting the insulated conductive wires at two ends of the earphone line and forming conductors by grouping several corresponding insulated conductive wires together, wherein the conductors at two ends of the earphone line are to be connected to output and input ends of a signal connecting apparatus and of an earphone respectively when in use.

9. The method according to claim 8, wherein plural insulated conductive wires are wound around the bullet-proof fibre.

10. The method according to claim 9, wherein 12 to 36 insulated conductive wires are wound around the bullet-proof fibre.

11. The method according to claim 8, wherein several groups of conductors are formed and each group of conductors comprise multiple insulated conductive wires.

12. The method according to claim 11, wherein the conductors are of 3 to 8 groups and each group of conductors comprise 2 to 8 insulated conductive wires.

13. The method according to claim 8, wherein a fibre with strong anti-tension ability is made from multiple types of materials and the bullet-proof fibre is made from multiple such fibres.

14. The method according to claim 8, wherein the earphone line skin is compositely made from materials which are insulated, wear-resistant and having strong adhesive force, and the insulated conductive wires which are wound around the bullet-proof fibre are wrapped inside the earphone line skin closely.

* * * * *